United States Patent [19]
Smith et al.

[11] Patent Number: 5,486,340
[45] Date of Patent: *Jan. 23, 1996

[54] EXHAUST GAS CONDITIONING

[75] Inventors: James R. Smith; Peter L. Timms, both of Bristol, United Kingdom

[73] Assignee: The BOC Group plc, Windlesham, England

[*] Notice: The term of this patent shall not extend beyond the expiration date of Pat. No. 5,213,767.

[21] Appl. No.: 267,095

[22] Filed: Jun. 24, 1994

Related U.S. Application Data

[63] Continuation of Ser. No. 118,324, Sep. 9, 1993, abandoned, which is a continuation of Ser. No. 859,380, filed as PCT/GB90/01862, Nov., 29, 1990, abandoned.

[30] Foreign Application Priority Data

Dec. 2, 1989 [GB] United Kingdom .................. 8927314

[51] Int. Cl.$^6$ ............................ A62D 3/00; B01D 53/34; C01B 21/083
[52] U.S. Cl. .................. 423/240 S; 423/245.1; 423/659; 588/206; 588/215; 588/218
[58] Field of Search ............................ 423/240 R, 240 S, 423/655, DIG. 20; 588/206, 209, 215, 221, 248

[56] References Cited

U.S. PATENT DOCUMENTS

| | | | |
|---|---|---|---|
| 3,845,191 | 10/1974 | Bruce, Jr. | 423/240 S |
| 3,980,755 | 9/1976 | Black et al. | 423/240 S |
| 4,036,940 | 7/1977 | McLane | 423/503 |
| 4,442,077 | 4/1984 | Foster et al. | 423/210 |
| 4,535,072 | 8/1985 | Kitayama et al. | 502/411 |
| 4,629,611 | 12/1986 | Fan | 423/240 S |
| 4,684,510 | 8/1987 | Harkins | 423/240 S |
| 5,213,767 | 5/1993 | Smith et al. | 423/241 |

FOREIGN PATENT DOCUMENTS

| | | |
|---|---|---|
| 0280585 | 8/1988 | European Pat. Off. . |
| 0303368 | 2/1989 | European Pat. Off. . |
| 0384802 | 8/1990 | European Pat. Off. . |
| 3432033 | 3/1985 | Germany . |
| 61-204025 | 9/1986 | Japan . |
| 2163364 | 2/1986 | United Kingdom . |
| WO89/11905 | 12/1989 | WIPO . |

*Primary Examiner*—Gary P. Straub
*Attorney, Agent, or Firm*—David M. Rosenblum; Larry R. Cassett

[57] ABSTRACT

A method treating effluent gases including exposing the gases to silicon or a silicon rich alloy or substances at an elevated temperature.

10 Claims, No Drawings

EXHAUST GAS CONDITIONING

This is a continuation of application Ser. No. 08/118,324, filed Sep. 9, 1993, now abandoned, which was a continuation of application Ser. No. 07/859,380 filed as PCT/GB90/01862, Nov. 29, 1990, also abandoned.

The purpose of the invention is to convert certain hazardous gaseous effluents by chemical reaction into a form which makes their subsequent removal from the gas stream possible. The hazardous gases used here may be hard to remove from effluent gas stream by existing techniques, or the existing techniques are limited by the other constituents of the gas stream. Alternately the material to be destroyed may be in a concentrated form, having been collected for disposal.

The invention in another part will introduce a further chemical in front of the chemical proposed above whose purpose is to absorb the bulk of acid gases and hence protect the second stage from undue contamination or attack.

The gaseous effluents can be gases that contain chlorocarbons and/or chloroflourocarbons (CFCs) from a large variety of industrial processes, for example semi-conductor processing, CFC cleaning baths, fire fighting equipment filling or discharge, aerosol filling or discharge refrigeration applications, expanded foam production etc. The gaseous effluents may also contain chloro- aromatics for instance resulting from the incineration of materials such as P.V.C. and P.C.B.s etc. Such effluent gases may well co-exist in the exhaust stream with sulphur dioxide, hydrochloric acid gas, carbon dioxide, nitrogen oxygen and others.

The invention involves exposing the effluent gases to silicon or silicon rich alloys or substances, specifically but not exclusively, maganese silicon alloys, ferro silicon alloys and commercially pure silicon at an elevated temperature. The effect of the passage of C-Cl or CFCs or organo-chlorine compounds (both aromatic and aliphatic) through a bed of hot silicon is that the gases react with the silicon to form the silicon tetra-halide(s). These resultant mixture of gases being more reactive and much more readily removed by subsequent chemical reaction stages, or reaction with water in a water/aqueous solution scrubber. The resultant gas mixture from the silicon stage may also be reacted with magnesium oxide or calcium oxide (Patent application Ser. No. 8813270.9 now U.S. Pat. No. 5,213,767).

The second part of the invention introduces a quantity of magnesium oxide or calcium oxide or magnesium carbonate or calcium carbonate or magnesium hydroxide or calcium hydroxide or a material containing these materials to the inlet side of silicon containing bed. The magnesium oxide or calcium oxide material is heated to a temperature of 350° to 800° C, optimally 450° to 600° C. . This magnesium oxide or calcium oxide material reacts with many acids and acts as a filter for contaminants to reach and poison the silicon surface.

A further advantage of the magnesium oxide or calcium oxide bed held at elevated temperature is the disassociation of some gas species on hot base materials. Hydrogen selinide, silane and dichlorosilane will decompose on base materials held at elevated temperatures while other hydrides such as arsine, phosphine and diborane thermally decompose on the same surface.

In our experiments we show that when air containing chlorobenzine at a significant level is passed through a bed of silicon at elevated temperature (up to 600° C.) the chlorobenzine reacted with silicon and the toxic products were removed by a subsequent stage. The silicon surface did not passivate; no detectable carbon, carbide film was detected. Where it is required to pass carbon-halide compounds in the absence of air over a similar bed we have found that silicon carbide is formed. This carbide is also effective in reacting with the incoming vapours, but blinding will eventually reduce the effectiveness of the silicon bed. The use of ferro-silicon alloys overcomes this problem in part by the iron reacting with carbon on the surface of the ferro silicon, reducing the rate of blinding of the surface. The presence of oxygen also removed carbon deposits while the oxides of silicon and iron retain adequately reactivity at these temperatures.

Thus as has been mentioned above, the invention from one aspect comprises a method of treating effluent gases including exposing the gases to silicon or silicon rich alloy or substance at an elevated temperature.

The treated gases may be then further treated by means of wet scrubbers or other known technology.

In a preferred embodiment the effluent gases are pretreated by passing them over magnesium oxide or calcium oxide, which may also be at an elevated temperature, for example 450°–600° C.

From a further aspect the invention consists in the method of treating halide containing or hydride containing gases by passing them through or over a magnesium oxide or calcium oxide bed held at an elevated temperature.

The silicon treatment is particularly effective for chloroflouro carbons, organo- halogens compounds and organo-sulphur compounds e.g. dichloroethyl sulphide (mustard gas).

Thus features of the invention are as follows:

1. That a gas stream of inert gas, or an inert gas containing a proportion of air, or air containing chlorocarbons, and/or chloro-flouro carbons passed over a bed of silicon material at a temperature of 300°–900° C. but an optimum temperature of 450°–650° C. will cause the said chloro-carbons/chloro-flouro carbons to react to form compounds that are readily removed in a subsequent reaction stage.

2. That vapour of chloro-carbons/chloro-flouro carbons passed over a pre-heated bed of silicon or silicon rich alloy as above will react to form products that are largely vapours that Can-be readily removed in a subsequent reaction stage.

3. As above but including organo chlorine compounds (aromatic).

4. As above but containing organo-chloro compounds (aliphatic).

5. The above containing organo-sulphur compounds.

6. The introduction of a magnesium oxide or calcium oxide bed at an elevated temperature in front of the reaction stages as above to remove acid gases.

7. The introduction of a magnesium oxide or calcium oxide bed at an elevated temperature to decompose hydride gases by a combination of thermal and chemical reaction.

8. The use of ferro-silicon alloys both in the presence of oxygen and the absence of oxygen to reduce the effect of the silicon materials losing their effectiveness due to a build up of carbon.

We claim:

1. A method treating gases including exposing the gases in sequential order to: a first reaction stage comprising a magnesium or calcium material, wherein said magnesium or calcium material is calcium oxide, calcium carbonate, calcium hydroxide, magnesium oxide, magnesium carbonate, magnesium hydroxide or mixtures thereof; and a second reaction stage comprising a silicon material, wherein said silicon material is silicon or silicon alloys.

2. The method as claimed in claim 1 wherein the effluent gases include an organo-halogen compound or an organo-sulphur compound.

3. The method as claimed in claim 1, wherein the silicon alloys are ferro silicon alloy, manganese silicon alloy and said silicon is commercially pure silicon.

4. A method as claimed in claim 1 wherein the gases are exposed to the silicon material in the presence of oxygen.

5. The method according to claim 1, wherein the in which the magnesium or calcium material is at a temperature in a range of 350° to 800° C.

6. The method as claimed in claim 5, wherein the magnesium or calcium material is at a temperature in the range of 450° to 600° C.

7. The method according to claim 6 in which the silicon material is at a temperature in the range of 300° to 900° C.

8. The method according to claim 6 in which the silicon material is at a temperature in the range of 450° to 650° C.

9. The method as claimed in claim 1 wherein the gases are reacted with magnesium oxide or calcium oxide after they have been exposed to the silicon material.

10. The method as claimed in claim 1, wherein the gases are further treated by means of wet scrubbers.

* * * * *